May 24, 1949.  G. E. HENNING  2,471,324
APPARATUS FOR ADVANCING NONMETALLIC PLASTIC MATERIAL
Filed Nov. 13, 1946  2 Sheets-Sheet 1
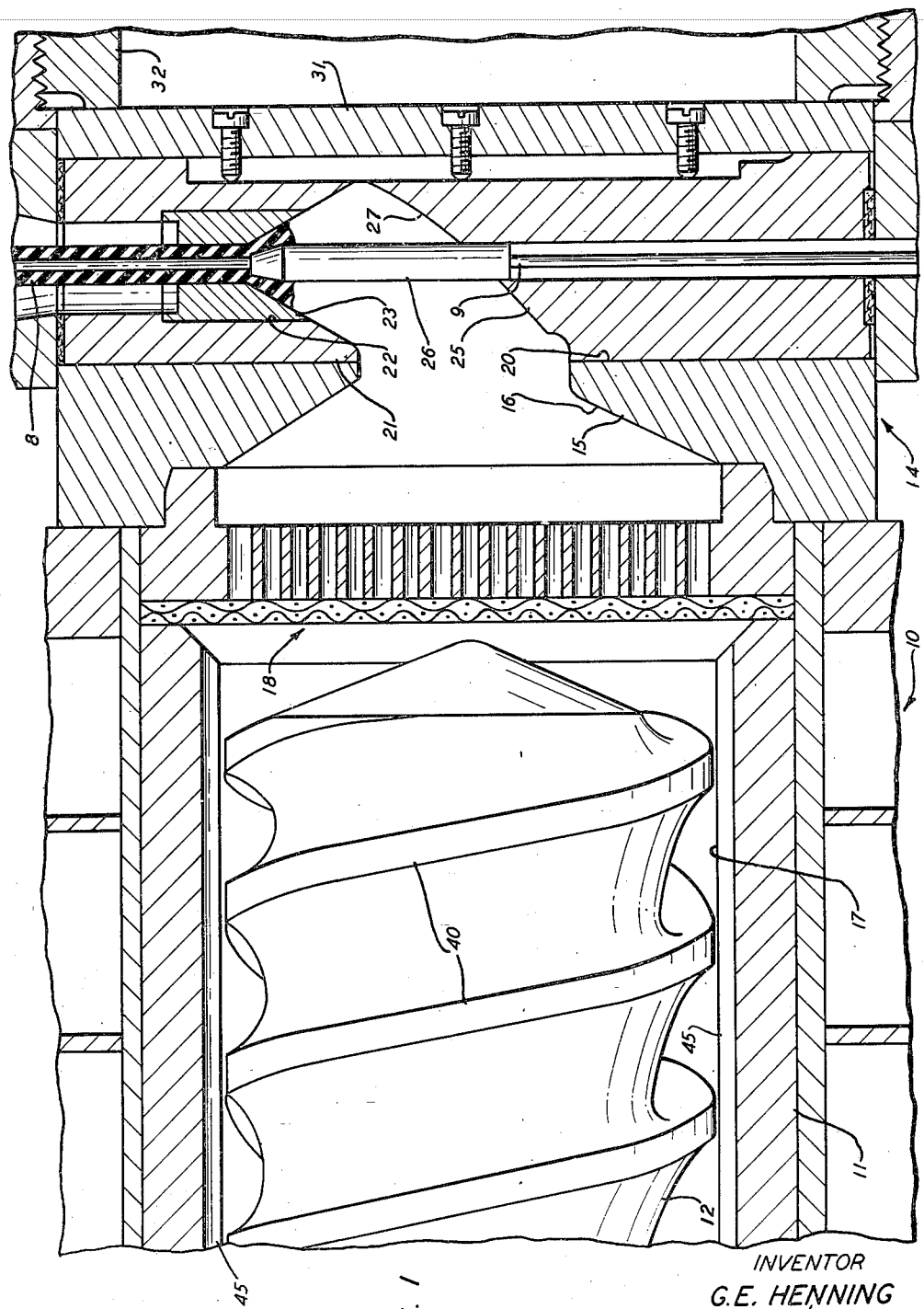
FIG. I
INVENTOR
G.E. HENNING
BY
ATTORNEY May 24, 1949.　　　　　G. E. HENNING　　　　　2,471,324
APPARATUS FOR ADVANCING NONMETALLIC PLASTIC MATERIAL
Filed Nov. 13, 1946　　　　　　　　　　　2 Sheets-Sheet 2
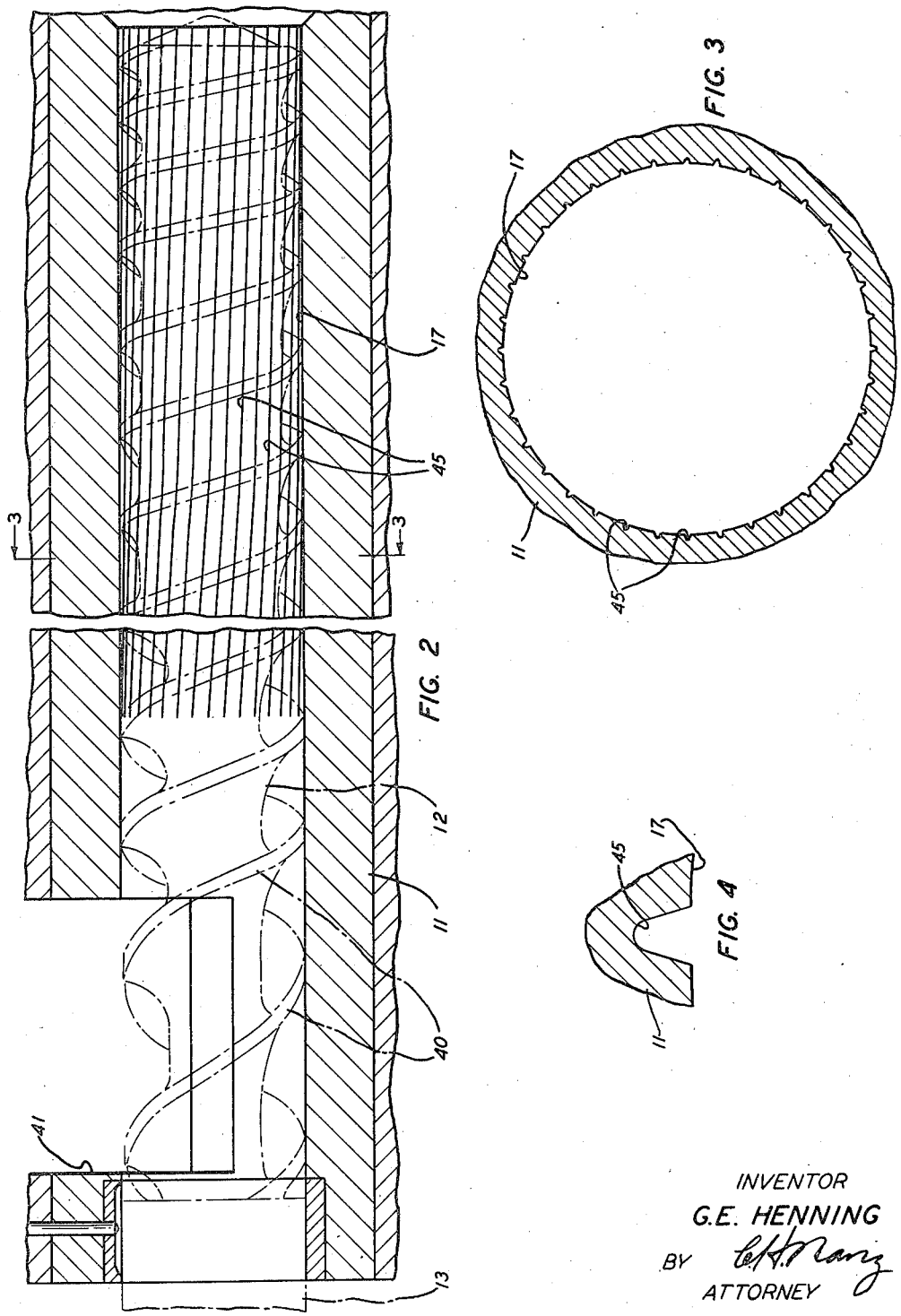
INVENTOR
G.E. HENNING
BY
ATTORNEY Patented May 24, 1949

2,471,324

UNITED STATES PATENT OFFICE 2,471,324

APPARATUS FOR ADVANCING NON-METALLIC PLASTIC MATERIAL

George E. Henning, Baltimore, Md., assignor to Western Electric Company, Incorporated, New York, N. Y., a corporation of New York Application November 13, 1946, Serial No. 709,479

1 Claim. (Cl. 18—13)

This invention relates to an apparatus for advancing non-metallic plastic material.

In the manufacture of extruded products, such as insulated conductors, plastic material, such as thermoplastic compounds or compounds including rubber or synthetic rubber-like materials, sometimes are milled to thoroughly mix and plasticize the material so that it may be extruded properly. The material then is inserted into an extruder, which extrudes the material upon a conductor, while the material is in a plastic condition. Such working operations are relatively expensive and require considerable handling of the material. In the past, there has been no apparatus for reducing or substantially eliminating the necessity of the working operations prior to the insertion of the material into the extruder.

An object of the invention is the provision of new and improved apparatus for advancing non-metallic plastic material.

A further object of the invention is the provision of new and improved apparatus for forcing plastic material through extrusion cylinders onto conductors.

An apparatus illustrative of the invention is provided with an extrusion cylinder having a liner provided with a plurality of longitudinally extending grooves for preventing plastic material from turning with a stock screw rotated therein, whereby the delivery efficiency of the stock screw is increased.

A complete understanding of the invention may be obtained from the following detailed description of an apparatus forming a specific embodiment thereof, when read in conjunction with the appended drawings, in which:

Fig. 1 is a fragmentary, horizontal section of an apparatus forming one embodiment of the invention;

Fig. 2 is a reduced, fragmentary, vertical section of a portion of the apparatus;

Fig. 3 is an enlarged, fragmentary section taken along line 3—3 of Fig. 2, and

Fig. 4 is an enlarged, fragmentary, transverse, vertical section of a portion of the apparatus.

Referring now in detail to the drawings, there is shown in Fig. 1 an extruder for forming a covering 8 from a non-metallic plastic material, such as a vulcanizable compound including rubber or a synthetic rubber-like material, or a thermoplastic compound, around a filamentary conductor 9, which may be bare or may be covered with a textile or plastic covering. The extruder includes a heated extrusion cylinder 10 having a bore 11 in which a stock screw 12 is rotatably mounted. The stock screw is rotated by a shaft 13 (Fig. 2) to force the plastic material under high pressure to an extruding head 14 (Fig. 1).

The extruding head includes a body member 15 having a tapered opening 16, which forms a continuation of the bore 11 and communicates with a bore 20 formed in the extruding head transversely of the tapered opening 16. A strainer 18 is positioned between a rapid discharge section 17 of the bore 11 and the tapered opening 16 for straining oversized particles from the material. An annular die holder 21 positioned in the exit end of the bore 20 has a counterbore 22 formed therein in which is mounted a forming die 23.

The conductor 9 is advanced upwardly, as viewed in Fig. 1, by suitable conductor-advancing means, such as a capstan (not shown), through a core tube holder 25 and a core tube 26, which is held by the core tube holder 25. The core tube holder is provided with an inclined concave surface 27 for deflecting the plastic material toward the die 23. An aligning plate 31 maintains the die holder 21 and the core tube holder 25, and thereby the die 23 and the core tube 26, centered relative to each other in the bore 20, and a retaining nut 32 holds these elements in the extruding head 14.

The extrusion cylinder 10 has a charging opening 41 (Fig. 2) therein for introducing plastic material into the extrusion cylinder. The extrusion screw is provided with a pair of helical threads 40—40 for advancing the plastic material from the left end, as viewed in Fig. 2, of the bore 11 to the right end thereof. As the screw 12 is rotated by the shaft 13, the helical threads 40—40 tend to advance the material toward the right. However, there is a tendency for the material to be revolved by the threads in the bore 11, and if the material would so revolve, it would not be advanced as rapidly toward the right as where the material did not revolve. Substantially longitudinal grooves 45—45 extending for the major portion of the length of the bore 11 in long pitch helices directed in the direction of rotation of the screw from left to right, as viewed in Fig. 2, are filled with the plastic material, and tend to prevent the plastic material from being revolved in the bore with the stock screw 12. Since the grooves 45—45 tend to key the material to the cylinder 10, they retard the revolving of the material with the stock screw and the stock screw rotates at a rate of speed relatively greater with respect to the material than if the material revolved with the stock screw thereby advancing the material more rapidly to the right, as viewed in Fig. 2, in the rapid discharge section 17 than would be the case if the material would be free to revolve with the stock screw. Hence, the delivery efficiency of the stock extruder is increased.

The grooves 45—45 have a slight pitch in a direction opposite to that of the threads 40—40 so that the material in the grooves is forced therealong during the extrusion operation. Hence, the grooves are constantly being cleared, which might be important where a compound including thermosetting material is extruded inasmuch as clogging of the grooves by thermosetting material is prevented by the self-clearing action of the grooves. However, the pitch of the grooves is so slight that the keying action of the grooves is not materially affected.

In the operation of the apparatus described hereinabove, the stock screw 12 is revolved in the bore 11 by the drive shaft 13. Plastic material is introduced into the extrusion cylinder 10 through the opening 41, and is urged by the stock screw 12 toward the right, as seen in Fig. 2. As the material is urged by the stock screw along the bore 11, it is worked by the stock screw and is plasticized. The substantially longitudinal grooves 45—45 in the rapid discharge section 17 of the bore 11 tend to key the material to the extrusion cylinder and prevent revolving of the material with the stock screw. Consequently, substantially all the force exerted by the threads 40—40 on the material is directed toward advancing the material toward the right, as viewed in Fig. 2. The material is forced from the extrusion bore through the strainer 18 into and through the extruding head 14, which forms the material into the covering 8 (Fig. 1) on the conductor 9.

The longitudinal grooves 45—45 (Fig. 2) markedly increase the delivery efficiency of the extruder so that a much larger quantity of plastic material per unit of time may be forced through the rapid discharge section 17 of the bore 11 for a given rate of rotation of the stock screw 12 than would be the case if the grooves 45—45 were not present. The grooves 45—45 are small enough in depth that slippage of the material over the threads 40—40 of the stock screw 12 is negligible, but are large enough to substantially retard revolution of the material. The slight helical direction of the grooves 45—45 aids in forcing the material along the grooves, which action might be important where thermosetting material is extruded by the apparatus in order to prevent setting of the material in the grooves.

What is claimed is:

An apparatus for advancing non-metallic plastic material, which comprises an extrusion cylinder having a bore formed therein, a stock screw positioned in the bore and having threads extending helically in a predetermined direction therearound, and means for rotating the stock screw to advance plastic material through the extrusion cylinder in a predetermined direction, said extrusion cylinder being provided with a plurality of internal grooves extending along a predetermined portion thereof, said grooves being slightly helical in a direction opposite to that of the threads of the stock screw so that the material in the grooves is forced therealong, said grooves serving to prevent revolution of the plastic material with the stock screw and thereby increasing the delivery efficiency of the stock screw.

GEORGE E. HENNING.

REFERENCES CITED

The following references are of record in the file of this patent:

UNITED STATES PATENTS

| Number | Name | Date |
|---|---|---|
| 1,403,681 | Gordon | Jan. 17, 1922 |
| 1,718,893 | Brown | June 25, 1929 |
| 2,200,997 | Royle | May 14, 1940 |

FOREIGN PATENTS

| Number | Country | Date |
|---|---|---|
| 568,579 | France | 1924 |